United States Patent
Chi et al.

(10) Patent No.: US 10,897,077 B2
(45) Date of Patent: Jan. 19, 2021

(54) INVISIBLE ANTENNAS

(71) Applicant: HEWLETT-PACKARD DEVELOPMENT COMPANY, L.P., Houston, TX (US)

(72) Inventors: David Chi, Taipei (TW); Leo Joseph Gerten, Taipei (TW); Hung-Wen Cheng, Taipei (TW); Po Chao Chen, Taipei (TW); Shih Huang Wu, Taipei (TW); Sean Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 16/081,132

(22) PCT Filed: Oct. 24, 2016

(86) PCT No.: PCT/US2016/058397
§ 371 (c)(1),
(2) Date: Aug. 30, 2018

(87) PCT Pub. No.: WO2018/080420
PCT Pub. Date: May 3, 2018

(65) Prior Publication Data
US 2019/0013573 A1 Jan. 10, 2019

(51) Int. Cl.
*H01Q 1/38* (2006.01)
*G06F 1/16* (2006.01)
(Continued)

(52) U.S. Cl.
CPC ............ *H01Q 1/38* (2013.01); *G06F 1/1616* (2013.01); *G06F 1/1698* (2013.01);
(Continued)

(58) Field of Classification Search
CPC .. H01Q 1/38; H01Q 5/38; H01Q 1/22; H01Q 1/24; H01Q 1/48; H01Q 9/30
(Continued)

(56) References Cited

U.S. PATENT DOCUMENTS

| 8,130,150 B2 * | 3/2012 | Wang | H01Q 1/2266 343/700 MS |
|---|---|---|---|
| 8,866,679 B2 | 10/2014 | Golko et al. | |
| 2010/0321253 A1 * | 12/2010 | Ayala Vazquez | H01Q 1/2258 343/702 |
| 2011/0012794 A1 | 1/2011 | Schlub et al. | |

(Continued)

FOREIGN PATENT DOCUMENTS

| CN | 1595718 A | 3/2005 |
|---|---|---|
| CN | 102227036 A | 10/2011 |

(Continued)

OTHER PUBLICATIONS

Wong et al., "Small-Size Uniplanar WWAN Tablet Computer Antenna Using a Parallel-Resonant Strip for Bandwidth Enhancement", IEEE Transactions on Antennas and Propagation, vol. 61, Issue 1, Retrieved from Internet: http://www.ora.nsysu.edu.tw/db/hici_pdf/492-496.pdf, Jan. 2013, pp. 492-496.

*Primary Examiner* — Andrea Lindgren Baltzell
(74) *Attorney, Agent, or Firm* — Tong, Rea, Bentley & Kim LLC

(57) ABSTRACT

In example implementations, an antenna for a mobile device is provided. The antenna includes a printed circuit board and a plurality of metal members coupled to the printed circuit board. The printed circuit board is devoid of metal traces. The plurality of metal members is positioned along a length of the printed circuit board to operate at a desired frequency band when inserted into an opening along an outer edge perimeter of a metallic housing of the mobile device.

12 Claims, 4 Drawing Sheets

(51) Int. Cl.
   *H01Q 1/24*    (2006.01)
   *H01Q 5/385*   (2015.01)
   *H01Q 9/30*    (2006.01)
   *H01Q 1/22*    (2006.01)
   *H01Q 1/48*    (2006.01)

(52) U.S. Cl.
   CPC ......... *H01Q 1/2266* (2013.01); *H01Q 1/2291* (2013.01); *H01Q 1/243* (2013.01); *H01Q 1/48* (2013.01); *H01Q 5/385* (2015.01); *H01Q 9/30* (2013.01)

(58) Field of Classification Search
   USPC .................................................. 343/700 MS
   See application file for complete search history.

(56) References Cited

U.S. PATENT DOCUMENTS

| | | |
|---|---|---|
| 2012/0112970 A1 | 5/2012 | Caballero et al. |
| 2013/0203364 A1 | 8/2013 | Darnell et al. |
| 2014/0009355 A1 | 1/2014 | Samardzija et al. |
| 2014/0184450 A1 | 7/2014 | Koo et al. |
| 2014/0218250 A1 | 8/2014 | Kim et al. |
| 2014/0361932 A1 | 12/2014 | Irci et al. |
| 2015/0029068 A1 | 1/2015 | Toyao et al. |
| 2015/0084817 A1 | 3/2015 | Yong |
| 2015/0236426 A1 | 8/2015 | Zhu et al. |

FOREIGN PATENT DOCUMENTS

| | | |
|---|---|---|
| WO | 1998043323 A1 | 10/1998 |
| WO | 2015156606 A1 | 10/2015 |

\* cited by examiner

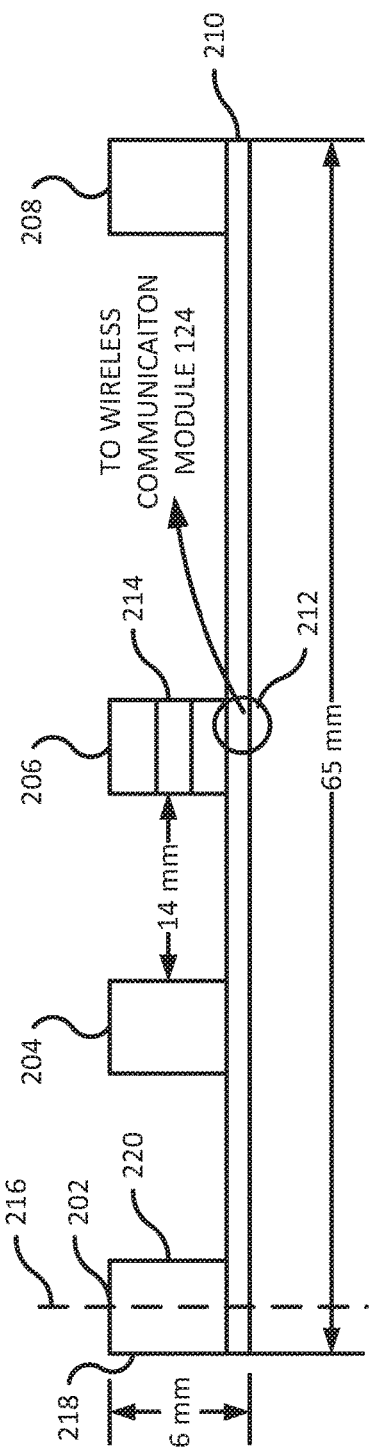
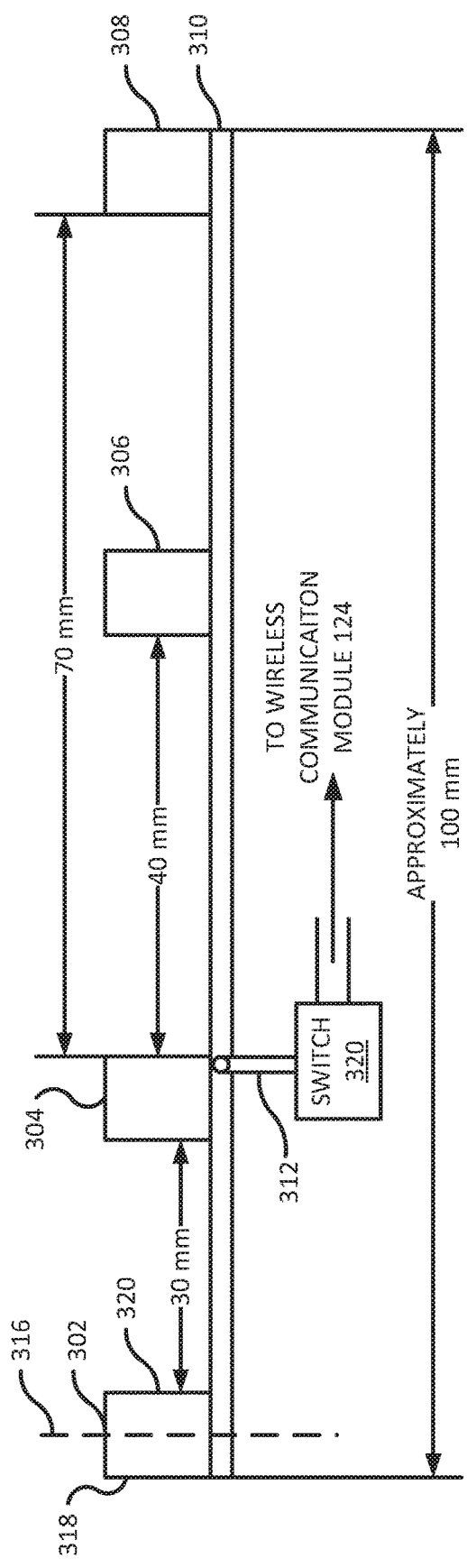

INVISIBLE ANTENNAS

BACKGROUND

Mobile devices use antennas for wireless communications. The antennas can be fabricated by forming metal traces within a printed circuit board. For example, a lithography process can be used to form the metal trace lines, for example copper traces, in the printed circuit board.

The antenna can be located inside of the mobile device and radiate through a housing of the mobile device. The type of antenna that is deployed may depend on the frequency used by the type of wireless communication used by the mobile device.

BRIEF DESCRIPTION OF THE DRAWINGS

FIG. 2 is a block diagram of an example invisible antenna of the present disclosure;

FIG. 3 is a block diagram of a second example invisible antenna of the present disclosure;

DETAILED DESCRIPTION

The present disclosure discloses an example of invisible antennas, and methods for producing the invisible antennas, used in mobile devices. As discussed above, mobile devices use antennas for wireless communications. The aesthetic design of mobile devices has moved towards using all metallic housings to enclose the display and other internal components including the antennas. However, metallic housings can be a shielding surface that can block the radiation of the antenna located within the housing. As a result, the performance of the antenna can be negatively affected.

Some designs have attempted to create the antenna into the metallic housing itself. However, this can create a more complicated process to produce the metallic housing. In addition, the externally located antenna can be susceptible to damage.

In one example, the present disclosure provides an invisible antenna that can be located near an edge or perimeter of the metallic housing of a mobile device via a slot or opening. As a result, the shielding effect of the metallic housing that negatively affects the radiation of the antenna is eliminated or minimized.

In addition, the present disclosure provides an "invisible" antenna by using a printed circuit board (PCB) that is free from, or devoid of, any metal traces or trace lines. In other words, the PCB of the present disclosure does not have any metal traces. Rather, metal members or metal clips, are attached to the PCB at various distances to achieve a desired operating frequency, or frequencies, for the antenna. Since the PCB does not have any metal traces, complicated lithography processes can be avoided. As a result, the antenna can be produced more efficiently and at a lower cost.

Figure 1:
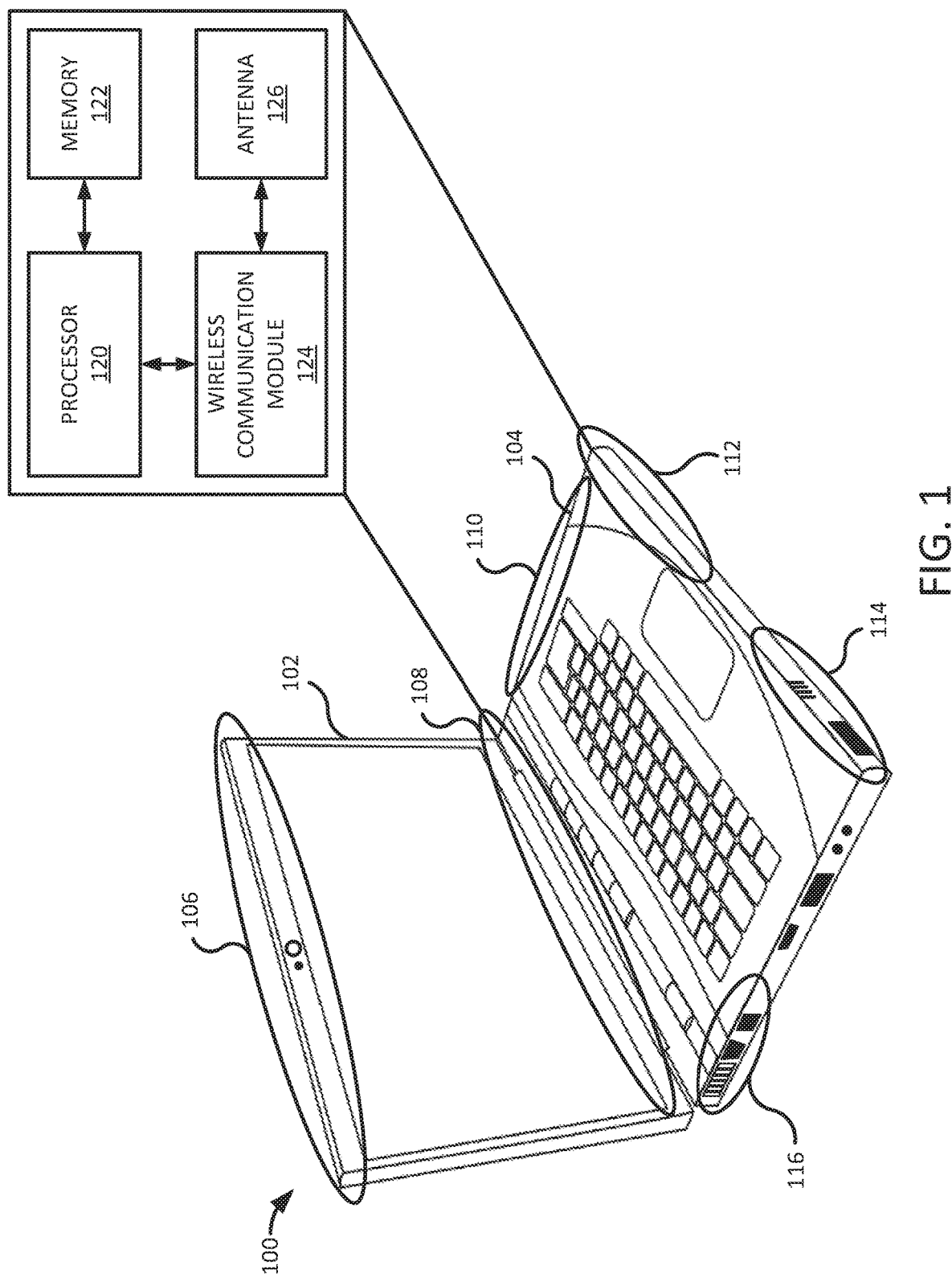
FIG. 1 is a block diagram of an example mobile device of the present disclosure.

FIG. 1 illustrates a block diagram of an example mobile device 100 of the present disclosure. The mobile device 100 may include metallic housings 102 and 104. For example, the metallic housing 102 may enclose the display and the components associated with the display. The metallic housing 104 may enclose the keyboard and internal components of the mobile device 100. Although the mobile device 100 is illustrated as having multiple metallic housings 102 and 104, it should be noted that some examples of the mobile device 100 (e.g., a tablet computer) may have a single metallic housing.

The metallic housings 102 and 104 may be made of any type of metal or metallic alloys. For example, the metallic housings 102 and 104 may be fabricated from aluminum, magnesium alloys, and the like.

The internal components may include a processor 120, a memory 122, a wireless communication module 124 and an antenna 126. It should be noted that the mobile device 100 may include other internal components not shown, such as for example, a graphics card, an audio card, and the like.

In one example, the wireless communication module 124 may be any type of wireless communication module. For example, when the mobile device 100 is a laptop or tablet computer, the wireless communication module 124 may be a wireless local area network (WLAN) network card that communicates at wireless frequencies of 2.4 Gigahertz (GHz) and 5 GHz. In another example, when the mobile device 100 is a mobile telephone or cellphone, the wireless communication module 124 may be a wireless wide area network (WWAN) card (e.g., an long term evolution (LTE) module) that communicates at various frequency bands (e.g., approximately 704 Megahertz (MHz)-894 MHz, approximately 791 MHz-960 MHz, approximately, 1710 MHz-2170 MHz, approximately, 2500 MHz-2700 MHz, and the like).

Figure 4:
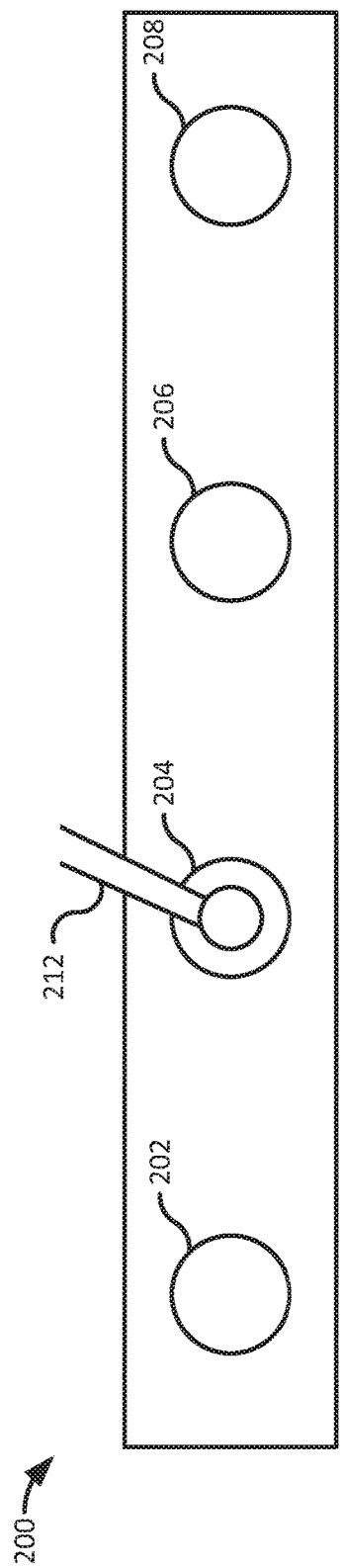
FIG. 4 is a block diagram of a top view of an example invisible antenna of the present disclosure.

In one example, the antenna 126 may be an invisible antenna. Examples of the antenna 126 are illustrated in FIGS. 2-4 and discussed below. In one example, the antenna 126 may be located in an opening located along an outer edge perimeter, or an outer side, of the metallic housing 102 or 104. FIG. 1, illustrates various locations 106, 108, 110, 112, 114 and 116 that may be examples of an outer edge perimeter or an outer side of the metallic housings 102 and 104.

An opening may be located at one of the various locations 106, 108, 110, 112, 114 and 116. The antenna 126 may be inserted into the opening and positioned adjacent to, or near, the metallic housings 102 and 104 at one of the locations 106, 108, 110, 112, 114 and 116. As a result, the metallic housings 102 and 104 may not interfere with the radiation of the antenna 126 and allow the antenna 126 to operate properly without shielding from the metallic housing 102 or 104.

FIG. 2 illustrates an example invisible antenna 200 of the present disclosure. The antenna 200 may include a PCB 210 and a plurality of metal members or metal clips 202, 204, 206 and 208. It should be noted that although four metal members are illustrated in FIG. 2, the invisible antenna 200 may include any number of metal clips depending on a number of operating frequencies or frequency bands that are desired for the invisible antenna 200.

In one example, the metal members 202, 204, 206 and 208 may be fabricated from copper or any other conductive metal. In one implementation, the metal members 202, 204, 206 and 208 may be coupled to the PCB 210 mechanically. For example, the metal members 202, 204, 206 and 208 may be fabricated as metal clips that are spring loaded or have a pre-loaded tension that are clipped onto an edge of the PCB 210. In another implementation, the metal members 202, 204, 206 and 208 may be glued or soldered to the PCB 210.

The metal members 202, 204, 206, 208 may have any geometric shape. FIG. 4 illustrates a top view of one example of the invisible antenna 200 that has circular shaped metal members 202, 204, 206 and 208. As can be seen in FIG. 4, the PCB 210 is devoid of, or free from, any metal traces. As noted above, the antenna is "invisible" because no metal traces are formed in the PCB 210. As a result, complicated lithography processes are avoided to fabricate the PCB 210. Rather, the metal members 202, 204, 206 and 208 are separately coupled to the PCB 210 allowing for a more efficient manufacturing process.

Referring back to FIG. 2, the invisible antenna 200 may be used for WLAN communications (e.g., a Wi-Fi connection in a laptop computer). WLAN communications may operate at 2.4 GHz and 5.0 GHz. As a result, the metal members 202, 204, 206 and 208 may be positioned, or spaced apart, to allow the invisible antenna 200 to radiate at operational frequencies of 2.4 GHz and 5.0 GHz.

Each of the metal members 202, 204, 206 and 208 may have a left edge 218, a center 216 and a right edge 220. The distances discussed below for various designs of the invisible antenna 200, and the invisible antenna 300 illustrated in FIG. 3, may be measured from a right edge 218 of one metal member 202, 204, 206 or 208 to a left edge 220 of another metal member 202, 204, 206 or 208. In another example, the distances discussed below may be measured from the center 216 of one metal member 202, 204, 206 or 208 to the center 216 of another metal member 202, 204, 206 or 208.

In one example, a first metal member 202 may be located at a first end along a length of the PCB 210. A second metal member 208 may be located at an opposite second end along a length of the PCB 210 approximately at a distance of approximately 65 millimeters (mm) from the first metal member 202. A third metal member 206 may be located approximately at a center along the length of the PCB 210 between the first metal member 202 and the second metal member 208. In one example, the distance from the third metal member 206 to the second metal member 208 may be approximately 37.5 mm. The spacing between the third metal member 206 and the second metal member 208 may allow the invisible antenna 200 to operate at a frequency of 2.4 GHz.

A fourth metal member 204 may be located between the first metal member 202 and the third metal member 206. The fourth metal member 204 may be spaced at a distance of approximately 14 mm from the third metal member 206. The spacing between the fourth metal member 204 and the third metal member 206 may allow the invisible antenna to operate at a frequency of 5 GHz.

In one example, a height of the invisible antenna 200 may be a function of an amount of clearance available in an opening of the metallic housing 102 or 104 of the mobile device 100. In one implementation, the height of the invisible antenna 200 may be approximately 3-10 mm, or approximately 6 mm.

In one example, the third metal member 206 may be a feeding clip and the remaining metal members 202, 204 and 208 may be the grounding clips. The third metal member 206 may include a series capacitor 214 to improve antenna matching of the invisible antenna 200.

In one example, coaxial cable 212 may be coupled to the third metal member 206. The coaxial cable 212 may connect the invisible antenna 200 to the wireless communication module 124. The coaxial cable 212 may also ground the invisible antenna 200 via the metallic housings 102 and 104.

For example, the invisible antenna 200 may be coupled to the metallic housing 102 or 104, which may indirectly couple to a layer of the coaxial cable 212 to ground the invisible antenna 200.

FIG. 3 illustrates another example of an invisible antenna 300. The invisible antenna 300 may be used for WWAN communications (e.g., an LTE connection in a mobile telephone). WWAN communications may operate at a plurality of different frequency bands. For example, WWAN communications may operate at a plurality of different states that are each associated with a different frequency band. In one example, a first state may operate at a low frequency band of approximately 704 MHz to 894 MHz. A second state may operate at a low frequency band of approximately 791 MHz to 960 MHz. A third state may operate at a mid-frequency band of approximately 1710 MHz to 2170 MHz. A fourth state may operate at a high frequency band of approximately 2500 MHz to 2700 MHz. A plurality of metal members or metal clips 302, 304, 306 and 308 may be positioned, or spaced apart, to allow the invisible antenna 300 to radiate at the different states and associated frequency bands of each state.

Similar to FIG. 2, in FIG. 3 each of the metal members 302, 304, 306 and 308 may have a left edge 318, a center 316 and a right edge 320. The distances discussed below for various designs of the invisible antenna 300 may be measured from a right edge 318 of one metal member 302, 304, 306 or 308 to a left edge 320 of another metal member 302, 304, 306 or 308. In another example, the distances discussed below may be measured from the center 316 of one metal member 302, 304, 306 or 308 to the center 316 of another metal member 302, 304, 306 or 308.

In one implementation, a first metal member 302 may be located at a first end along a length of the PCB 310. A second metal member 308 may be located at an opposite second end along a length of the PCB 310 approximately 100 mm from the first metal member 302. A third metal member 306 may be located between the first metal member 302 and the second metal member 308. The third metal member 306 may be positioned at a distance of approximately 30 mm from the first metal member 302 and approximately 70 mm from the second metal member 308. It should be noted that the overall length of 100 mm may slightly differ from a sum of the distances between the other metal members 302, 304, 206 and 308 depending on how the distances are measured (e.g., from edge to edge, center to center, and the like).

The spacing between the first metal member 302 and the third metal member 304 may allow the invisible antenna 300 to operate at a frequency band of approximately 2500 MHz to 2700 MHz associated with the fourth state. The spacing between the third metal member 304 and the second metal member 308 may allow the invisible antenna 300 to operate at a frequency bands of approximately 704 MHz to 894 MHz and 791 MHz to 960 MHz associated with the first state and second state, respectively.

A fourth metal member 306 may be located between the third metal member 306 and the second metal member 308. The fourth metal member 306 may be spaced at a distance of approximately 40 mm from the third metal member 304. The spacing between the fourth metal member 306 and the third metal member 304 may allow the invisible antenna 300 to operate at a frequency band of approximately 1710 MHz to 2170 MHz associated with the third state.

In one example, the third metal member 304 may be a feeding clip and the remaining metal members 302, 306 and 308 may be the grounding clips. The third metal member 304 may include a series capacitor 314 to improve antenna matching of antenna 300.

In one example, coaxial cable 312 may be coupled to the third metal member 304. The coaxial cable 312 may connect the invisible antenna 300 to a switch 320 and the wireless communication module 124. In one example, the switch 320 may be a four state switch to allow the invisible antenna 300 to operate at one of the four different states described above.

The coaxial cable 312 may also ground the invisible antenna 300 via the metallic housings 102 and 104. For example, the invisible antenna 300 may be coupled to the metallic housing 102 or 104, which may indirectly couple to a layer of the coaxial cable 312 to ground the invisible antenna 300.

Although FIG. 2 and FIG. 3 illustrate two examples of various spacing of metal members, it should be noted that the spacing and distance between metal members may vary depending on a desired operating frequency of the antenna. In other words, additional metal members may be added at various distances along the length of the PCB to operate at additional frequencies or frequency bands.

Figure 5:
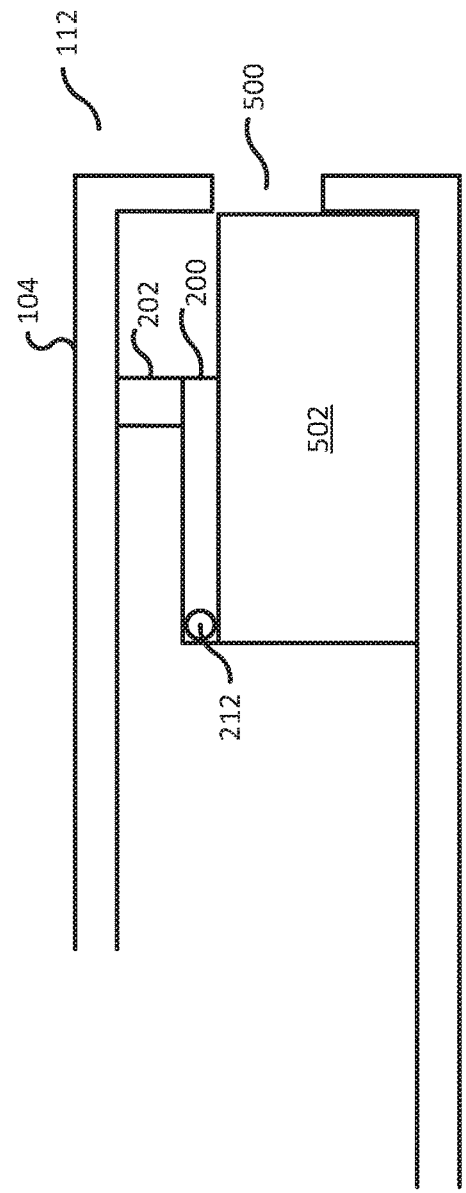
FIG. 5 is a block diagram of an example invisible antenna that is inserted into an opening of a metallic housing of the mobile device.

FIG. 5 illustrates a block diagram of an example invisible antenna 200 that is inserted into an opening 500 of a metallic housing 104 of the mobile device 100. FIG. 5 illustrates a cross-sectional side view of the opening 500. In one example, the opening 500 may be created at location 112 of the mobile device 100 illustrated in FIG. 1.

The invisible antenna 200 may be coupled to a plastic holder 502 that is positioned to be as close to the opening 500 as possible. The metal members 202, 204, 206 and 208 may contact the metal housing 104 for grounding.

The invisible antenna 200 may also be located near the opening 500 to prevent the metallic housing 104 from shielding the radiation of the invisible antenna 200. Said another way, the invisible antenna 200 may be located adjacent to the metallic housing 104, or as close to the edge or outer perimeter of the metallic housing 104 without extending past the edge or the outer perimeter of the metallic housing 104.

Figure 6:
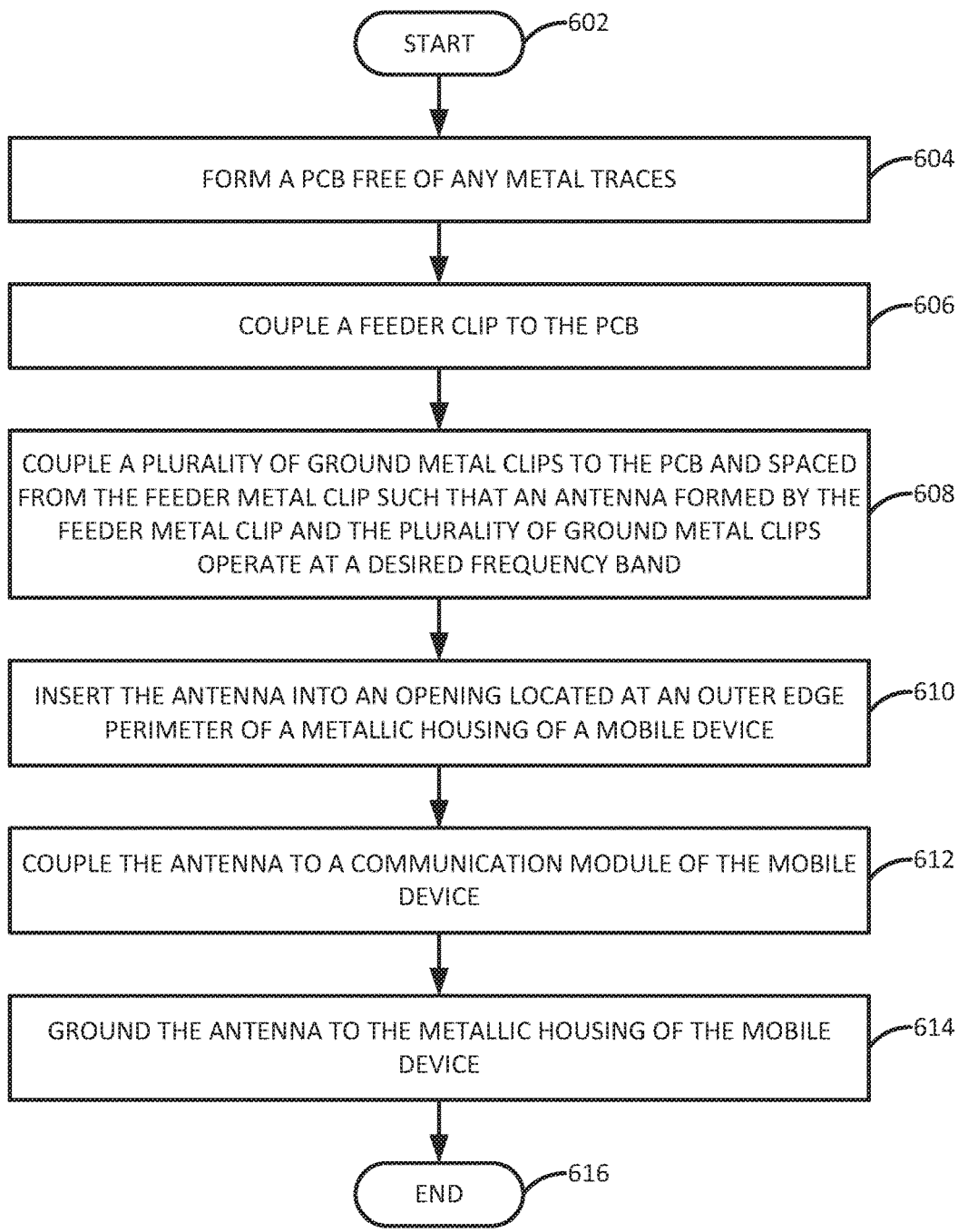
FIG. 6 is a flow diagram of an example method for assembling a mobile device with an invisible antenna.

FIG. 6 illustrates a flow diagram of an example method 600 for assembling a mobile device with an invisible antenna. In one example, the blocks of the method 600 may be performed by one or more machines of an automated assembly line that is controlled by a processor.

At block 602, the method 600 begins. At block 604, the method 600 forms a PCB free of any metal traces. For example, the PCB may have an insulating layer and conductive layer used for PCBs, but without the metal traces and vias typical used to connect different layers of the PCB. As a result, lithography processes may be avoided.

At block 606 the method 600 couples a feeder metal clip to the PCB. The feeder metal clip may be a metal member that is coupled to the PCB. In one example, the feeder clip may be coupled via mechanical means. In another example, the feeder metal clip may be coupled via an adhesive or soldered onto the PCB.

In one example, a coaxial cable may be coupled to the feeder metal clip for grounding and connecting to a wireless communication module. The feeder metal clip may be any geometric shape, such as a circle, square, oval, and the like or more complicated non-geometric shapes.

At block 608, the method 600 couples a plurality of ground metal clips to the PCB and spaced from the feeder metal clip such that an antenna formed by the feeder metal clip and the plurality of ground metal clips operate at a desired frequency band. In one example, the ground metal clips may also be metal members that are coupled to the PCB. In one example, the ground metal clips may be coupled via mechanical means. In another example, the ground metal clips may be coupled via an adhesive or soldered onto the PCB.

The spacing or distances between the feeder metal clip and the ground metal clips may be a function of desired operating frequencies or frequency bands associated with a type of wireless communication. For example, for a WLAN antenna the feeder metal clips and the ground metal clips may be spaced to operate at 2.4 GHz and 5.0 GHz. Examples of the spacing between the feeder clip and the ground metal clips for a WLAN antenna are described above and illustrated in FIG. 2.

In another example, for a WWAN antenna, the feeder metal clips and the ground metal clips may be spaced to operate at a plurality of different frequency bands associated with different states. Examples of the spacing between the feeder clip and the ground metal clips for a WWAN antenna are described above and illustrated in FIG. 3.

At block 610, the method 600 inserts the antenna into an opening located at an outer edge perimeter of a metallic housing of a mobile device. For example, various locations of the metallic housing may be acceptable for creating the opening. FIG. 1 illustrates different possible locations that can be used. FIG. 5 illustrates an example of how the antenna may be inserted into the opening.

At block 612, the method 600 couples the antenna to a communication module of the mobile device. For example, a coaxial cable coupled to the feeder metal clip may be coupled to the communication module of the mobile device. In one example, the communication module may be a wireless communication module.

At block 614, the method 600 grounds the antenna to the metallic housing of the mobile device. In one example, one of the layers of the coaxial cable may ground the antenna via an indirect connection to the metallic housing of the mobile device. At block 616, the method 600 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An antenna, comprising:
   a printed circuit board that is devoid of metal traces; and
   a plurality of metal members coupled to the printed circuit board, wherein the plurality of metal members is positioned along a length of the printed circuit board to operate at a desired frequency band when inserted into an opening along an outer edge perimeter of a metallic housing of a mobile device.

2. The antenna of claim 1, wherein the plurality of metal members comprises a circular contact.

3. The antenna of claim 1, wherein one of the plurality metal members comprises a feeding clip and a remaining one of the plurality of metal members comprises a grounding clip.

4. The antenna of claim 3, wherein the feeding clip is coupled to a communication module and the metallic housing via a coaxial cable.

5. The antenna of claim 3, wherein the feeding clip further comprises a series capacitor.

6. The antenna of claim 1, wherein the plurality of metal members comprises a first metal member, a second metal member, a third metal member and a fourth metal member, wherein an edge of the first metal member and an edge of the fourth metal member are spaced at a distance of approximately 65 millimeters (mm) apart, wherein an edge of the third metal member is spaced at a distance of approximately 37.5 mm from the edge of the first metal member and the edge of the fourth metal member, wherein an edge of the second metal member is spaced at a distance of approximately 14 mm from the edge of the second metal member.

7. The antenna of claim 1, wherein the plurality of metal members comprises a first metal member, a second metal member, a third metal member, and a fourth metal member, wherein an edge of the first metal member and an edge of the fourth metal member are spaced at a distance of approximately 100 millimeters (mm) apart, wherein an edge of the second metal member is spaced at a distance of approximately 25 mm from the edge of the first metal member, the edge of the third metal member is spaced at a distance of approximately 40 mm from the edge of the second metal member, wherein the edge of the fourth metal member is spaced at a distance of approximately 70 mm from the edge of the second metal member.

8. A mobile device, comprising:
   a processor;
   a memory in communication with the processor;
   a wireless communication module in communication with the processor;
   a metallic housing, wherein the metallic housing comprises at least one opening along an outer edge of the metallic housing and encloses the processor, the memory and the wireless communication module; and
   an antenna inserted into the at least one opening and coupled to the metallic housing and connected to the wireless communication module via a coaxial cable, wherein the antenna comprises:
      a printed circuit board that is devoid of metal traces; and
      a plurality of metal members coupled to the printed circuit board, wherein the plurality of metal members is positioned along a length of the printed circuit board to operate at a desired frequency band of the wireless communication module.

9. The mobile device of claim 8, wherein the wireless communication module comprises a wireless local area network (WLAN) module that operates frequencies of 2.4 gigahertz (GHz) and 5 GHz.

10. The mobile device of claim 9, wherein the plurality of metal members comprises a first metal member, a second metal member, a third metal member and a fourth metal member, wherein an edge of the first metal member and an edge of the fourth metal member are spaced at a distance of approximately 65 millimeters (mm) apart, wherein an edge of the third metal member is spaced at a distance of approximately 37.5 mm from the edge of the first metal member and the edge of the fourth metal member, wherein an edge of the second metal member is spaced at a distance of approximately 14 mm from the edge of the second metal member.

11. The mobile device of claim 8, wherein the wireless communication module comprises a wireless wide area network (WWAN) communication module that comprises a switch to operate the WWAN communication module at a plurality of different frequency bands.

12. The mobile device of claim 11, wherein the plurality of metal members comprises a first metal member, a second metal member, a third metal member, and a fourth metal member, wherein an edge of the first metal member and an edge of the fourth metal member are spaced at a distance of approximately 100 millimeters (mm) apart, wherein an edge of the second metal member is spaced at a distance of approximately 25 mm from the edge of the first metal member, the edge of the third metal member is spaced at a distance of approximately 40 mm from the edge of the second metal member, wherein the edge of the fourth metal member is spaced at a distance of approximately 70 mm from the edge of the second metal member.

* * * * *